US012669689B2

(12) United States Patent
Bor

(10) Patent No.: US 12,669,689 B2
(45) Date of Patent: Jun. 30, 2026

(54) ILLUMINATION SYSTEM AND METHOD FOR OPHTHALMIC SURGICAL MICROSCOPES

(71) Applicant: Alcon Inc., Fribourg (CH)

(72) Inventor: Zsolt Bor, San Clemente, CA (US)

(73) Assignee: Alcon Inc., Fribourg (CH)

( * ) Notice: Subject to any disclaimer, the term of this patent is extended or adjusted under 35 U.S.C. 154(b) by 808 days.

(21) Appl. No.: 17/405,889

(22) Filed: Aug. 18, 2021

(65) Prior Publication Data

US 2022/0075167 A1 Mar. 10, 2022

Related U.S. Application Data

(60) Provisional application No. 63/075,705, filed on Sep. 8, 2020.

(51) Int. Cl.
| | |
|---|---|
| *G02B 21/00* | (2006.01) |
| *G02B 21/36* | (2006.01) |
| *G02B 26/08* | (2006.01) |

(52) U.S. Cl.
CPC ....... *G02B 21/0012* (2013.01); *G02B 21/368* (2013.01); *G02B 26/0816* (2013.01)

(58) Field of Classification Search
CPC ............ G02B 21/00212; G02B 21/368; G02B 21/06; G02B 26/0816; G02B 27/0075; A61B 2017/00203; A61B 2017/00207; A61B 90/20; A61B 90/30; A61B 3/14
See application file for complete search history.

(56) References Cited

U.S. PATENT DOCUMENTS

| | | | |
|---|---|---|---|
| 7,307,785 B2 | 12/2007 | Obrebski | |
| 2008/0297892 A1* | 12/2008 | Abele ...................... | A61B 3/13 |
| | | | 359/389 |
| 2012/0026462 A1* | 2/2012 | Uhlhorn ................. | A61B 3/102 |
| | | | 351/246 |
| 2016/0143528 A1* | 5/2016 | Wilf ......................... | A61B 3/14 |
| | | | 351/246 |

FOREIGN PATENT DOCUMENTS

| | | |
|---|---|---|
| WO | 2020095445 A1 | 5/2020 |
| WO | 2021165831 A1 | 8/2021 |

OTHER PUBLICATIONS

Bekerman, Gottlieb, and Vaiman, Variations in Eyeball Diameters of the Healthy Adults, 2014, Journal of Ophthalmology, vol. 2014, Article ID 503645, see abstract (Year: 2014).*
Prasad and Galetta, Anatomy and physiology of the afferent visual system, Handbook of Clinical Neurology, 2011, vol. 102, p. 9 ( Year: 2011).*

* cited by examiner

*Primary Examiner* — Thomas K Pham
*Assistant Examiner* — Justin W. Hustoft
(74) *Attorney, Agent, or Firm* — PATTERSON + SHERIDAN, LLP

(57) ABSTRACT
The disclosure provides an ophthalmic surgical microscope including an optical axis. The ophthalmic surgical microscope also includes at least one light source configured to provide illumination having a wavelength range between 575 nm and 625 nm. The ophthalmic surgical microscope further includes a control device for directing the illumination at an acute angle relative to the optical axis of the microscope.

2 Claims, 6 Drawing Sheets

200

200

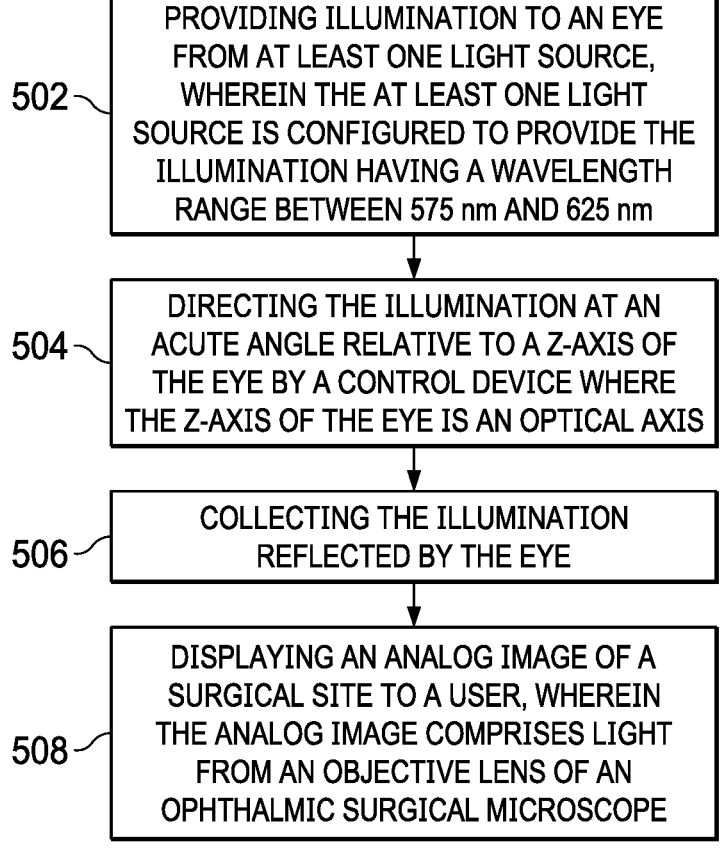

502 — PROVIDING ILLUMINATION TO AN EYE FROM AT LEAST ONE LIGHT SOURCE, WHEREIN THE AT LEAST ONE LIGHT SOURCE IS CONFIGURED TO PROVIDE THE ILLUMINATION HAVING A WAVELENGTH RANGE BETWEEN 575 nm AND 625 nm

504 — DIRECTING THE ILLUMINATION AT AN ACUTE ANGLE RELATIVE TO A Z-AXIS OF THE EYE BY A CONTROL DEVICE WHERE THE Z-AXIS OF THE EYE IS AN OPTICAL AXIS

506 — COLLECTING THE ILLUMINATION REFLECTED BY THE EYE

508 — DISPLAYING AN ANALOG IMAGE OF A SURGICAL SITE TO A USER, WHEREIN THE ANALOG IMAGE COMPRISES LIGHT FROM AN OBJECTIVE LENS OF AN OPHTHALMIC SURGICAL MICROSCOPE

FIG. 5

ILLUMINATION SYSTEM AND METHOD FOR OPHTHALMIC SURGICAL MICROSCOPES

CROSS-REFERENCE TO RELATED APPLICATIONS

This application claims the benefit of priority of U.S. Provisional Patent Application Ser. No. 63/075,705 titled "ILLUMINATION SYSTEM AND METHOD FOR OPH-THALMIC SURGICAL MICROSCOPES," filed on Sep. 8, 2020, which is hereby incorporated by reference in its entirety as though fully and completely set forth herein.

TECHNICAL FIELD

The present invention generally relates to an illumination system and, in particular, to an illumination system and method for an ophthalmic surgical microscope.

BACKGROUND

A cataract is a condition that causes the lens in the eye to become cloudy, which lead to a decrease in vision. Cataract surgery is a surgical procedure to restore the vision by removing the lens and replacing it with an artificial lens. Phacoemulsification is the most widely performed cataract surgery and generally involves six steps including anesthetic to numb the eye, corneal incision to allow insertion of surgical instruments into the eye, capsulorhexis to create a circular hole for the lens, phacoemulsification to emulsify the lens into emulsion using ultrasound waves, irrigation and aspiration to remove the emulsified lens material, and lens insertion. During the phacoemulsification step of the cataract surgery, ophthalmologists rely on the red reflex (a reddish-orange reflection of light from the back of the eye or fundus) to visualize a capsule, lens, vitreous cavity, and anterior chamber structure to accurately perform the surgery. Generally, when the cataract is denser, the red reflex tends to be weaker and not stable, which makes it difficult to visualize the internal components of the eye during the cataract surgery. This inhibits a complete removal of the lens resulting in poor surgical outcomes.

SUMMARY

The disclosure provides an ophthalmic surgical microscope including an optical axis. The ophthalmic surgical microscope also includes at least one light source configured to provide illumination having a wavelength range between 575 nm and 625 nm. The ophthalmic surgical microscope further includes a control device for directing the illumination at an acute angle relative to the optical axis of the microscope.

The above ophthalmic surgical microscope may be further characterized by one or more of the following additional elements, which may be combined with one another or any other portion of the description in this specification, including specific examples, unless clearly mutually exclusive:

i) the acute angle relative to the optical axis may be between 14 and 18 degrees for a left eye;

ii) the acute angle relative to the optical axis may be between −14 and −18 degrees for a right eye;

iii) the wavelength range of the illumination may be between 590 nm and 610 nm; and iv) the ophthalmic surgical microscope may provide F-number 15 or higher.

The disclosure provides an eye image displaying system including an ophthalmic surgical microscope which includes an optical axis. The ophthalmic surgical microscope also includes at least one light source configured to provide illumination having a wavelength range between 575 nm and 625 nm. The ophthalmic surgical microscope further includes a control device for directing the illumination at an acute angle relative to the optical axis. The eye image displaying system further includes a detector communicatively coupled to the ophthalmic surgical microscope, the detector configured to: collect the illumination reflected from an eye; and provide an analog image based on the illumination reflected from the eye.

The above eye image displaying system may be further characterized by one or more of the following additional elements, which may be combined with one another or any other portion of the description in this specification, including specific examples, unless clearly mutually exclusive:

i) the acute angle relative to the optical axis may be between 14 and 18 degrees for a left eye;

ii) the acute angle relative to the optical axis may be between −14 and −18 degrees for a right eye;

iii) the wavelength range of the illumination may be between 590 nm and 610 nm;

iv) the analog image may be converted into a digital image;

v) the digital image may be displayed on a screen;

vi) the digital image may be displayed by superimposing on the analog image;

vii) the ophthalmic surgical microscope may provide F-number 15 or higher; and viii) the ophthalmic surgical microscope further comprises a variable aperture disposed within the optical axis, wherein the variable aperture is adjusted to provide an increased depth of focus.

BRIEF DESCRIPTION OF THE DRAWINGS

Embodiments of the present disclosure are described by way of example in greater detail with reference to the attached figures, which are not necessarily to scale, and in which:

FIG. 5 is a flow chart illustrating a method for displaying images.

DETAILED DESCRIPTION OF THE INVENTION

The present disclosure is directed to illumination system and method for ophthalmic surgical microscopes to provide stable and strong red reflex. Embodiments of the present disclosure allow for clearly visualizing corneal, vitreous humor opacities, and floaters for a perfect removal of cataractous lens during a phacoemulsification cataract surgery.

Referring now to the description and drawings, example embodiments of the disclosed apparatuses, systems, and methods are shown in detail.

Figure 1:
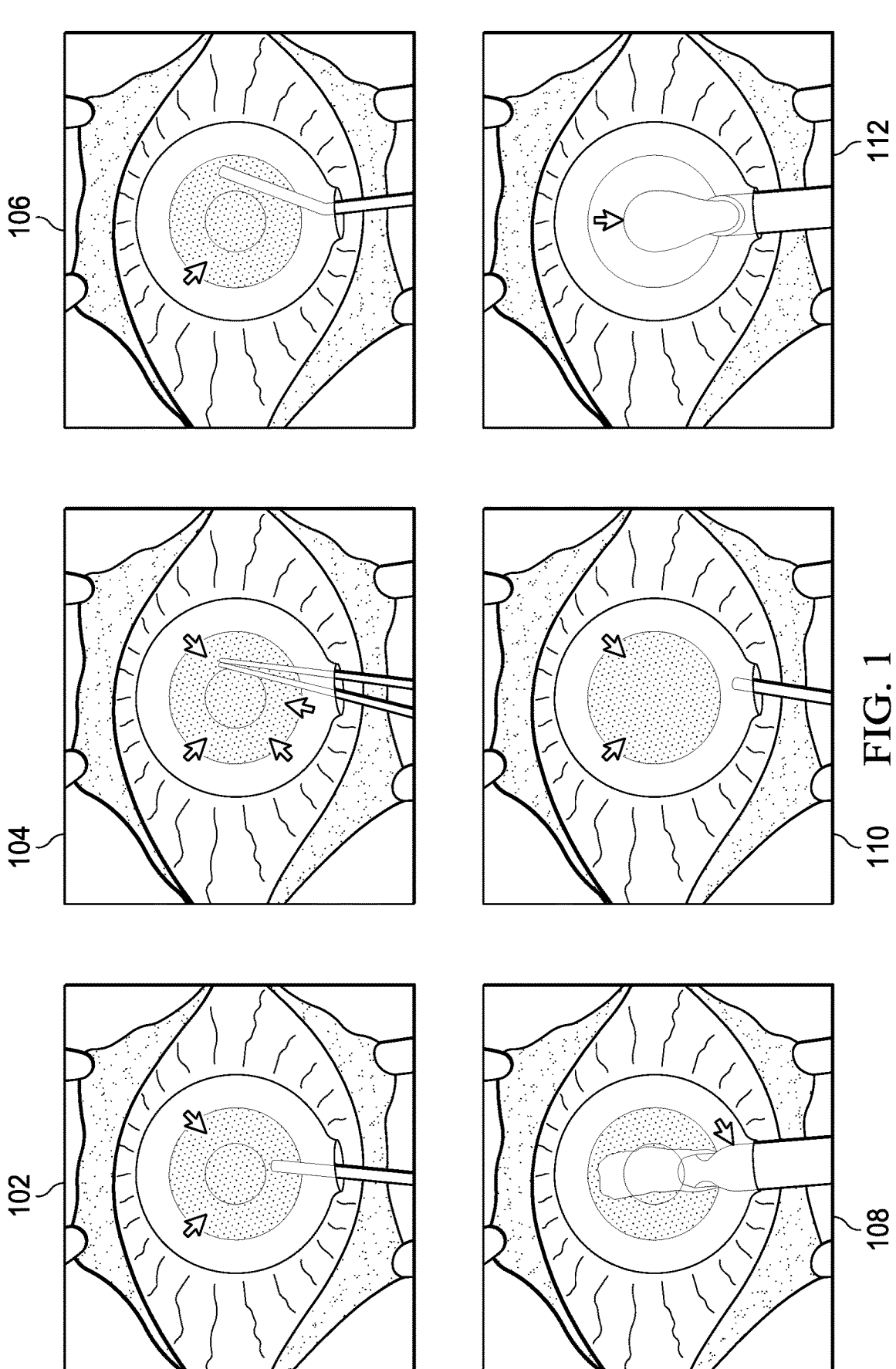
FIG. 1 is an illustration of surgical steps in phacoemulsification cataract surgery.

FIG. 1 is an illustration of surgical steps in phacoemulsification cataract surgery. Ophthalmic viscosurgical devices (OVDs) are routinely used in cataract surgery to protect delicate ocular structures (corneal endothelium) and to pressurize the anterior chamber. In step 102, OVDs are shown as optically clear as indicated by the arrows. In step 104, continuous curvilinear capsulorhexis is done to open the capsule. In step 106, a hydrodissection used between the capsule and the lens cortex allows the cataractous lens to be freed from the capsular bag as indicated by the arrow. In step 108, a phacoemulsification device is inserted to emulsify and aspirate the lens materials. In step 110, the lens materials are removed and OVDs are injected as indicated by the arrows. In step 112, an intraocular lens is implanted into the capsular bag.

Throughout the phacoemulsification cataract surgery illustrated in FIG. 1, the ophthalmologists rely on red reflex to visualize the anterior and posterior capsule and the anatomic structures of the eye. A patient is less likely to develop complications if the lens materials are completely removed in the step 108. Being able to catch any residual lens materials depends on how clearly the ophthalmologists see the anterior chamber, the anterior, and posterior capsule using red reflex by illumination source such as a fiber or light guide illumination. Thus, providing strong and stable red reflex improves the outcomes of phacoemulsification cataract surgery.

Figure 2A:
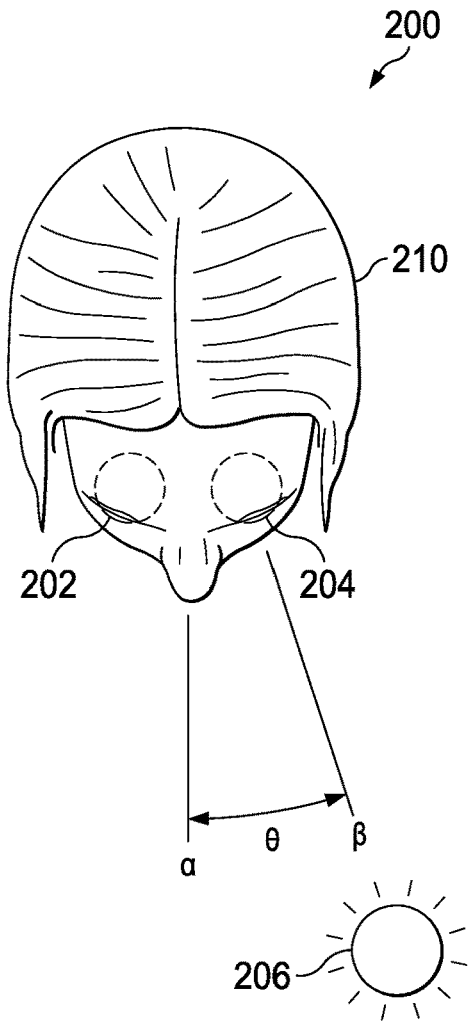
FIG. 2A is an illustration of an illumination system for red reflex.

Referring now to FIG. 2A, an illustration of an illumination system 200 for red reflex is described, in accordance with one or more embodiments. A human (or patient) 210 has a right eye 202 and a left eye 204. $\alpha$ axis is a longitudinal axis that is parallel to the line connecting between the back of a head and a tip of a nose. In this sense, an axis $\alpha$ is a line dissecting a body in half separating right and left components of the body symmetrically when viewed from the top, as shown in FIG. 2A. An axis $\beta$ is a line connecting a light source 206 to an eye (in this case the left eye 204 in FIG. 2A). In this regard, the $\beta$ axis is a direction of an illumination emitted by the light source 206. An angle $\theta$ is defined by both $\beta$ axis and $\alpha$ axis.

In one embodiment, an illumination system 200 includes a light source 206 suitable for human eyes. For example, the light source 206 may include visible lights. For instance, the visible light may include light-emitting diode (LED), fluorescent lights, or tungsten light. The visible spectrum is the portion of the electromagnetic spectrum which is visible to the human eye and corresponds to wavelengths from about 380 to 740 nm. Further, the light source 206 of the illumination system 200 provides illumination to the left eye 204. For example, the light source 206 may include coaxial illumination and temporal illumination.

In order to gain maximum strength of the red reflex of an eye, the light source 206 of the illumination system 200 is preferably LEDs having a wavelength range between 550 nm and 650 nm (600±50 nm), more preferably between 575 nm and 625 nm (600±25 nm), and more preferably between 590 nm and 610 nm (600±10 nm). The light source 206 within these wavelengths complies maximum permissible exposures for ocular safety ANSI 2000 (thermal and photochemical vulnerability of a retina) and satisfies spectral reflectivity of a retina and spectral sensitivity of a surgeon's retina. In this regard, the light source with the preferred wavelength range may be configured to provide a maximum visibility of the red reflex, while minimizing a damage of the patient's eyes.

Red reflex is a reflection of light from the back of the eye. Therefore, the intensity of red reflex depends on both a strength of a light source and an illumination angle of the light source. In one embodiment, the light source 206 is positioned relative to the left eye 204 such that an angle $\theta$ created by $\beta$ axis and $\alpha$ axis is selected to increase the intensity of ref reflex. The angle $\theta$ may be an acute angle. For example, the angle $\theta$ may be between 12° and 20° ($\theta$=16±4°), more preferably between 14° and 18° ($\theta$=16±2°). Embodiments of the present disclosure may increase the intensity of red reflex about ten times (one order of magnitude). It is noted that the light source 206 should be directed from the temporal side of the head to obtain maximum intensity of red reflex.

The temporal angle 16±2 degree corresponds to the blind spot of the eye. The blind spot is a portion of the visual field that corresponds to the position of optic disk. The optic disk is an anatomical feature on the back of the eye where about one million of tiny nerves from the retina converge and exit the eye. On the surface of the optic disk there are no photoreceptors therefore the incident light is not absorbed, instead it is predominantly reflected. This is why the red reflex with a temporal angle of 16±2 degrees is at least 10 times more intensive compared to the red reflex with the light source 206 directed from the $\alpha$ axis (i.e., $\theta$=0 degree).

Figure 2B:
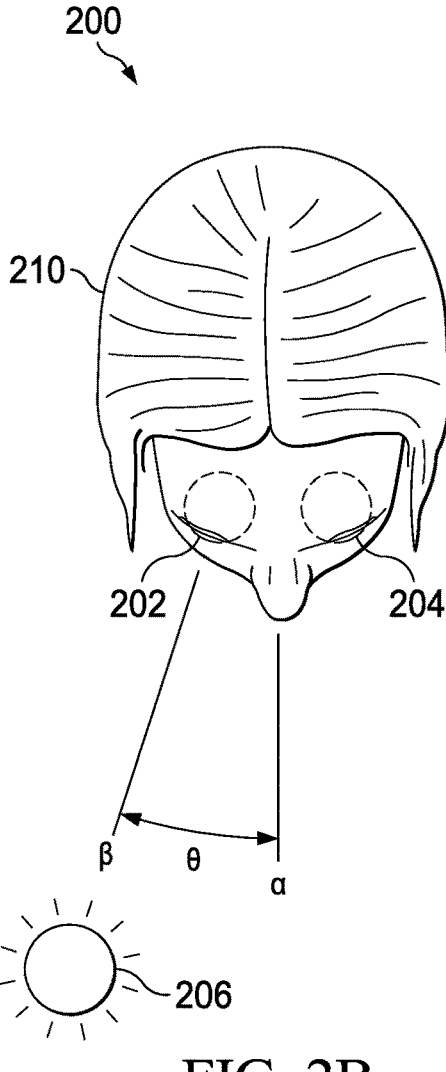
FIG. 2B is another illustration of an illumination system for red reflex.

FIG. 2B is another illustration of an illumination system for red reflex, in accordance with one or more embodiments. In one embodiment, the illumination system 200 includes a human 210, a right eye 202, a left eye 204, and a light source 206 as described hereinbefore. The light source 206 used to obtain maximum intensity of red reflex while minimizing damages to eyes may be LEDs having a wavelength range between 550 nm and 650 nm (600±50 nm), more preferably between 575 nm and 625 nm (600±25 nm), and more preferably between 590 nm and 610 nm (600±10 nm). The light source 206 is positioned relative to the right eye 202 such that an angle $\theta$ created by $\beta$ axis and $\alpha$ axis is selected to increase the intensity of red reflex. The angle $\theta$ may be an acute angle. For example, the angle $\theta$ may be between −12° and −20° ($\theta$=−16±4°), more preferably between −14° and −18° ($\theta$=−16±2°). It is noted that the light source 206 should be directed from the temporal side of the head to obtain maximum intensity of red reflex.

Due to the increased brightness of the red reflex, the F-number of a surgical microscope integrated with the illumination system described in the present disclosure may be increased, which leads to a considerable increase in depth of focus. This provides clearer (sharper) images to surgeons. For example, the F-number of the surgical microscope of the present disclosure may be 15 or higher.

F number is the ratio of the focal length of a system divided by the diameter of the entrance pupil. The numerical aperture (NA) of an optical system is a dimensionless number that characterizes the range of angles over which the system can accept or emit light. NA is defined as the half angle of the light cone which the optical system is capable to accept without vignetting the light cone. For surgical microscope F approximately equal to $F=1/(2*NA)$.

The light collection capability of the surgical microscope is proportional to the area of the entrance pupil. Thus, the light collection capability of the surgical microscope is proportional to $1/F^2$. It is noted that assuming 10 times increase of the intensity of the red reflex, the F number can be increased by square root of 10 (i.e., 3.16 times) to have the same brightness of the red reflex observed by the surgeon. Increasing the F number by 3.16 times leads to the depth of focus of the image of the eye increased by about 3.16 time. It is noted that the ophthalmic surgical microscope of the present disclosure allows for providing F-number 15 or higher.

Although the light source 206 shown in FIGS. 2A and 2B is illustrated not being attached to any surface, such a configuration is merely provided for illustrative purposes. Embodiments of the present disclosure may be configured to provide the light source 206 positioned on suitable places for eye surgery such as a surgical microscope, a part of surgical suite lighting, a surgeons' glass, and other surgical instruments. A direction of the illumination emitted from the light source 206 may be adjusted by several ways. For example, direction of the illumination emitted from the light source 206 may be adjusted manually by a user. By way of another example, direction of the illumination emitted from the light source 206 may be adjusted by a control device such as a controller in a surgical instrument computer.

It is further contemplated that embodiments of the present disclosure may be configured to integrate into an optical diagnostic system. For example, the optical diagnostic system equipped with the light source 206 may be used for routine eye examinations based on red reflex.

Figure 3:
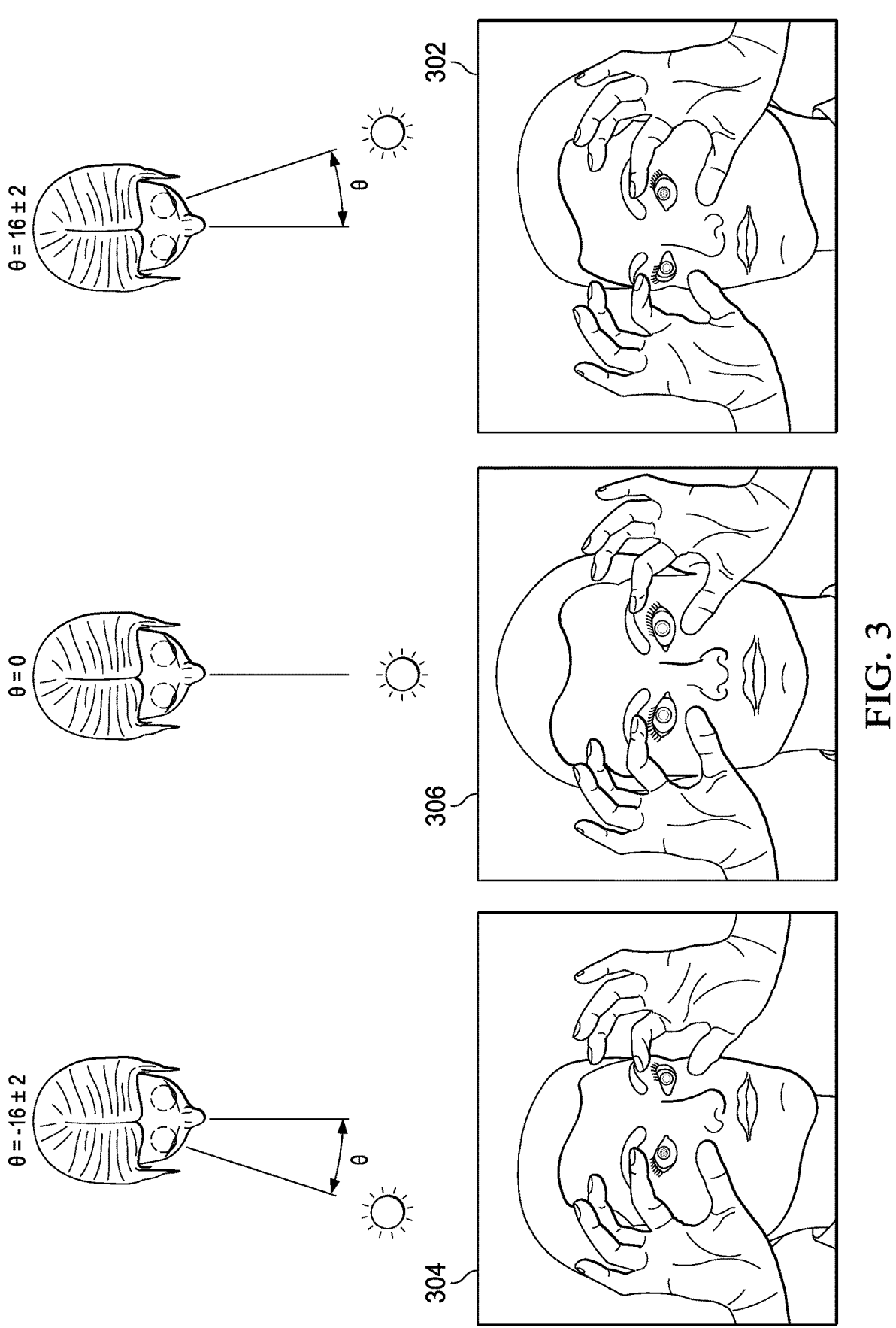
FIG. 3 demonstrates red reflex effects.

FIG. 3 demonstrates red reflex effects, in accordance with one or more embodiments of this disclosure. The red reflex on the left eye of a patient with embodiments described in FIG. 2A is shown 302. The light source 206 is positioned at the angle between 12° and 20° ($\theta=16\pm4°$), more preferably between 14° and 18° ($\theta=16\pm2°$). The red reflex on the right eye of a patient with embodiments described in FIG. 2B is shown 304. The light source 206 is positioned at the angle between −12° and −20° ($\theta=-16\pm4°$), more preferably between −14° and −18° ($\theta=-16\pm2°$). When the light source 206 is positioned parallel to $\alpha$ axis ($\theta=0$), no red reflex is observed 306.

Figure 4A:
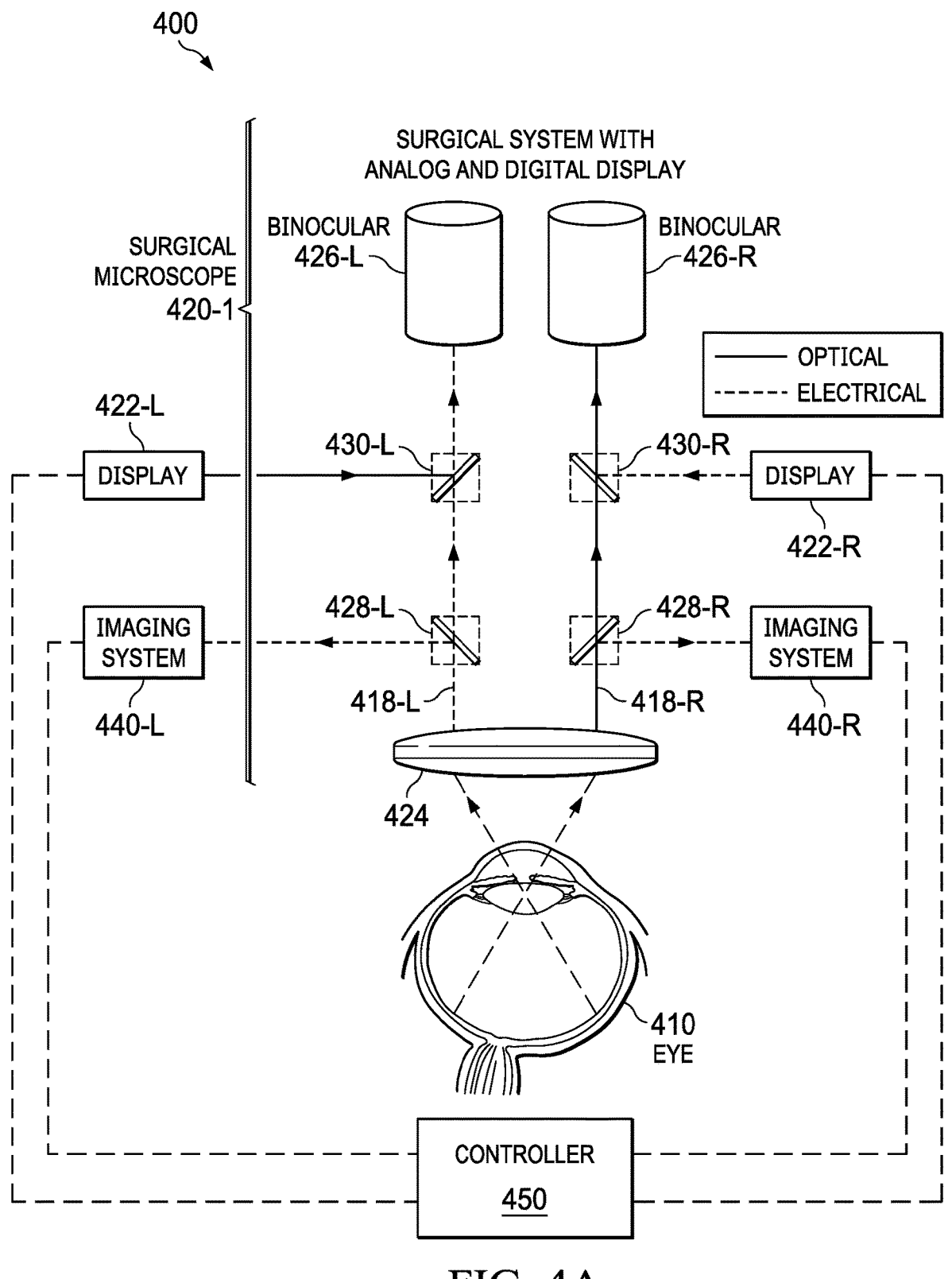
FIG. 4A is a block diagram of an ophthalmic surgical microscopy with analog and digital display.

FIG. 4A is a block diagram showing a surgical system 400 with analog and digital display. The ophthalmic surgical microscope or illumination system or both used in the surgical system may be as described in FIGS. 2A-3. For example, the light source of the illumination system may be attached to the body of the surgical microscope 420-1 or 420-2 of the surgical system 400. Red reflex images generated by the light source of the illumination system may be displayed on a binocular 426-L and 426-R. Further, red reflex images generated by the light source of the illumination system may be converted to digital images with the surgical system.

The surgical system 400 may be used during ophthalmic surgery to view and analyze a human eye 410 with either analog images or digital images. In one embodiment, the surgical system 400 includes a surgical microscope 420-1. For example, the surgical microscope 420-1 may include objective lens 424. For instance, the objective lens 424 may represent a selectable objective to provide a desired magnification or field of view of the eye 410. The objective lens 424 may receive light from the eye 410.

The surgical microscope 420-1 may include a left ocular beam 418-L and a right ocular beam 418-R which may be formed from light emerging from the eye 410. The light emerging from the eye 410 may be light reflected back from a light source that transmits incident light through the objective lens 424. The surgical microscope 420-1 may further include optical components such as shutters 428-L, 428-R, 430-L, and 430-R. The shutters control the brightness field of the surgical microscope 420-1. It is noted that while the shutters 428, 430 shown in FIG. 4A illustrated to have two shutters on each side, such a configuration is merely provided for illustrative purposes. Embodiments of the present disclosure may allow the surgical microscope to have more than three shutters on each side.

The surgical microscope 420-1 may also include surgical binoculars 426-L and 426-R. The surgical binoculars 426-L and 426-R receive left ocular beam 418-L and right ocular beam 418-R, respectively. The left ocular beam 418-L may arrive at the shutter 428-L, which is controllable to either reflect the left ocular beam 418-L to imaging system 440-L or to pass the left ocular beam 418-L towards the left ocular 426-L. When the shutter 428-L passes the left ocular beam 418-L, the left ocular beam 418-L arrives at the shutter 430-L, which is controllable to either pass the left ocular beam 418-L towards the left ocular 426-L or to reflect output light from display 422-L to the left ocular 426-L. In the similar manner, the right ocular beam 418-R may arrive at the shutter 428-R, which is controllable to either reflect the right ocular beam 418-R to the imaging system 440-R or to pass the right ocular beam 418-R towards the right ocular 426-R. When the shutter 428-R passes the right ocular beam 418-R, the right ocular beam 418-R arrives at the shutter 430-R, which is controllable to either pass the right ocular beam 418-R towards the right ocular 426-R or to reflect output light from display 422-R to the right ocular 426-R.

Accordingly, when the shutters 428, 430 pass respective ocular beam 418, the analog image of the eye 410 is viewed at the binoculars 426, and when the shutters 428, 430 reflect respective ocular beam 418, the digital image of the eye 410 is viewed at the binoculars 426. It is noted that imaging system 440 may be a singular system supporting left and right beams and is shown as 440-L and 440-R for descriptive clarity in FIG. 4A. It is also noted that the imaging system 440 may act as a detector and a camera. For example, the imaging system 440 may collect the illumination reflected by the eye and display an analog image of a surgical site to a user through binoculars. By way of another example, the analog image generated by the imaging system 440 may be converted into a digital image, which may be displayed on a screen.

Further, the surgical system 400 includes a controller 450. For example, the controller 450 may have an electrical interface with the display 422. In this regard, the controller 450 may receive digital data indicative of the digital image from the imaging system 440, may modify the digital data as described herein, and may output the digital image to the display 422 that is viewed at the binoculars 426. Because the electrical interface between the imaging system 440, the display 422 and the controller 450 may support digital data processing, the controller 450 may perform image processing on the digital data in real-time with relatively high frame refresh rates, such that a user of the surgical microscope 420-1 may experience substantially instantaneous display with little or no latency.

Further, the surgical system 400 includes the controller 450 electrically connected to a display 422 (422-R and 422-L). For example, the display 422 may represent a digital display device, such as a liquid crystal device (LCD) array. The display 422-L may generate a digital image for the left ocular 426-L, while the display 422-R may generate a digital image for the right ocular 426-R. In some embodiments, the display 422 includes miniature display devices that output images to the binoculars 426 for viewing by the user and are integrated within the ocular optics of the surgical microscope 420-1. It is noted that the display 422 may be a singular device with separate left and right display regions and is shown as 422-L and 422-R for descriptive clarity in FIG. 4A.

Additionally, the surgical system 400 includes a controller 450 electrically connected to an imaging system 440 (440-R and 440-L). The imaging system 440 may acquire digital images as light is transmitted from the objective lens 424 to the imaging system 440. The imaging system 440 may have a light sensitive sensor (a camera or a detector), such as a charge coupled device (CCD) array of optical sensors. The light sensitive sensor transforms the digital image into digital data, which can be processed using various methods, and which can subsequently be sent to the display 422 for viewing of the digital image by the user of the surgical microscope 420-1. As noted, the imaging system 440 may perform various kinds of digital processing on the digital image.

In operation of the surgical system 400, initially, the shutters 428, 430 may be set to pass through light from the objective lens 424 to the binoculars 426 along the ocular beam path 418 to enable viewing of the analog image. The user may then provide a first indication, such as a command such as software command, voice command, or gesture to the controller 450 to display the digital image. The controller 450 may then cause the shutters 428, 430 to actuate to place a mirror in the ocular beam paths 418. As a result, light from the objective lens 424 is redirected to the imaging system 440, where the light is acquired and digitally sampled to generate the digital image in the form of digital data. As directed or set-up by the user, the imaging system 440 may further perform digital image processing on the image, as desired. After any digital image processing (or no digital image processing) is performed, the resulting digital image in the form of digital data may be sent to the display 422, which outputs the digital image to the binoculars 426 for viewing by the user. Additionally, at some later time, the user may provide a second indication to switch the surgical microscope 420-1 back to viewing with the analog image, such that the shutters 428, 430 are once again set to pass through light along the ocular beam path 418 to the binoculars 426, as described above. In this manner, the user may be able to switch back and forth between viewing the analog image and the digital image.

Figure 4B:
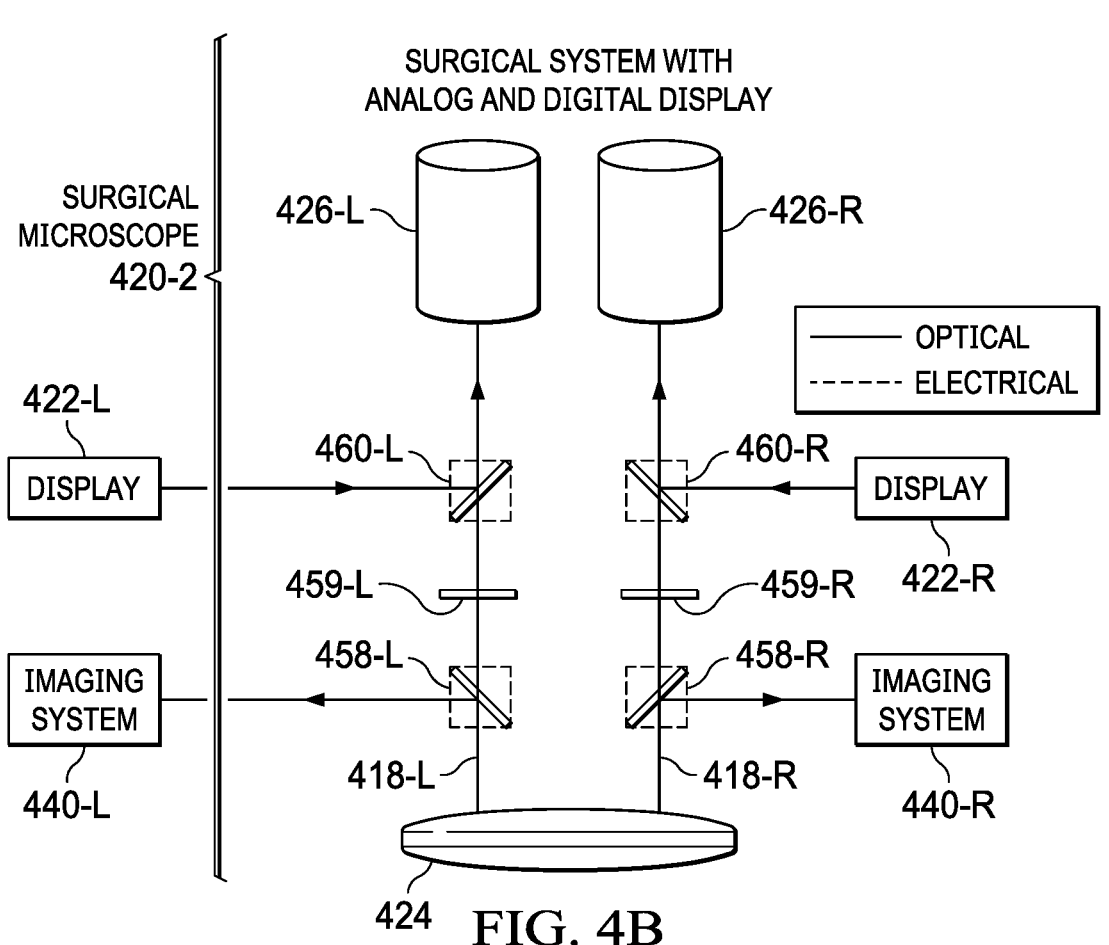
FIG. 4B is another block diagram of an ophthalmic surgical microscopy with analog and digital display with shutters.

FIG. 4B is a block diagram showing a surgical system with analog and digital display and shows another embodiment of a surgical microscope 420-2 that may be used in the surgical system 400 in place of surgical microscope 420-1 described in FIG. 4A. For example, in the surgical microscope 420-2 the ocular beam 418-L from the objective lens 424 may pass through a beam splitter 458-L, which may split the ocular beam 418-L into two beams: a first beam to the imaging system 440-L and the remaining light propagating along the ocular beam 418-L. For instance, 30% of the intensity is directed to the first beam while 70% of the intensity remains in the ocular beam 418-L. A beam combiner 460-L may receive the digital image from the display 422-L and superimpose the digital image onto the ocular beam 418-L. Additionally, a shutter 459-L may control propagation of the ocular beam 418-L from the beam splitter 458-L. A similar arrangement with beam splitter 458-R, shutter 459-R, and beam combiner 460-R may be implemented for the right ocular in the surgical microscope 420-2. Thus, in the surgical microscope 420-2, the optical image may be viewed by opening the shutter 459 and turning off the display 422. The digital image may be viewed by closing the shutter 459 and turning on the display 422. In the surgical microscope 420-2, the optical image and the digital image may be superimposed by opening the shutter 459 and turning on the display 422.

It is noted that a variable aperture may be disposed within the optical axis of the surgical microscope 420-2. Lenses with variable apertures mean that the aperture changes based on a focal length. When the red reflex is the brightest with the light source being directed with the acute angle relative to the optical axis between 14 and 18 degrees for a left eye and between −14 and −18 degrees for a right eye, embodiments of the present disclosure may be configured to shrink the variable aperture to increase the depth of focus of the microscope. Thus, the variable aperture may be adjusted to provide an increased depth of focus.

FIG. 5 illustrates a method for displaying images, in accordance with one or more embodiments of the present disclosure. The ophthalmic surgical microscope or illumination system or both used in this method may be as described in FIGS. 2A-3. It is noted that all of the steps shown in FIG. 5 are not essential to practice the method. One or more steps may be omitted from or added to the method illustrated in FIG. 5, and the method can still be practiced within the scope of this embodiment. Further, some of the steps may be performed in a different order and the method can still be practiced within the scope of this embodiment.

The method shown in FIG. 5 generally includes providing illumination to an eye from at least one light source, wherein the at least one light source is configured to provide the illumination having a wavelength range between 575 nm and 625 nm. The method also includes directing the illumination at an acute angle relative to a z-axis of the eye by a control device where the z-axis of the eye is an optical axis α. The method further includes collecting the illumination reflected by the eye. The method includes displaying an analog image of a surgical site to a user, wherein the analog image comprises light from an objective lens of an ophthalmic surgical microscope.

As shown in step 502 of FIG. 5, the method includes providing illumination to an eye from at least one light source, wherein the at least one light source is configured to provide the illumination having a wavelength range between 575 nm and 625 nm. The illumination is preferably LEDs having a wavelength range between 550 nm and 650 nm (600±50 nm), more preferably between 575 nm and 625 nm (600±25 nm), and more preferably between 590 nm and 610 nm (600±10 nm).

As shown in step 504 of FIG. 5, the method includes directing the illumination at an acute angle relative to a z-axis of the eye by a control device where the z-axis of the eye is an optical axis. The illumination is directed at an angle to increase the intensity of red reflex. For example, the angle θ may be between 12° and 20° (θ=16±4°), more preferably between 14° and 18° (θ=16±2°).

Further, as shown in step 506 of FIG. 5, the method includes collecting the illumination reflected by the eye. Collecting the illumination reflected by the eye may be performed by a camera or detector of the illumination system.

As shown in step 508 of FIG. 5, the method includes displaying an analog image of a surgical site to a user, wherein the analog image comprises light from an objective lens of an ophthalmic surgical microscope.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is described herein as a single figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

Although this disclosure has been described in terms of certain embodiments, modifications (such as substitutions, additions, alterations, or omissions) of the embodiments will be apparent to those skilled in the art. Accordingly, modifications may be made to the embodiments without departing from the scope of the invention. For example, modifications may be made to the systems and apparatuses disclosed herein. The components of the systems and apparatuses may be integrated or separated, and the operations of the systems and apparatuses may be performed by more, fewer, or other components. As another example, modifications may be made to the methods disclosed herein. The methods may include more, fewer, or other steps, and the steps may be performed in any suitable order.

What is claimed:

1. An ophthalmic surgical microscope comprising:
an optical axis;
at least one light source configured to provide illumination having a wavelength range between 590 nm and 610 nm; and
a control device for directing the illumination at an acute angle relative to the optical axis the acute angle including between 14 and 18 degrees for the left eye and between −14 and −18 degrees for the right eye;
wherein the ophthalmic surgical microscope provides an F-number equal to 15.

2. An eye image displaying system comprising:
an ophthalmic surgical microscope including:
an optical axis;
at least one light source configured to provide illumination having a wavelength range between 590 nm and 610 nm; and
a control device for directing the illumination at an acute angle relative to the optical axis, the acute angle including between 14 and 18 degrees for the left eye and between −14 and −18 degrees for the right eye; and
a detector communicatively coupled to the ophthalmic surgical microscope, the detector configured to:
collect the illumination reflected from the right eye or the left eye; and
provide an analog image based on the illumination reflected from the right eye or the left eye;
wherein the ophthalmic surgical microscope provides an F-number equal to 15.

* * * * *